United States Patent
McCants et al.

(10) Patent No.: US 12,434,103 B2
(45) Date of Patent: Oct. 7, 2025

(54) GOLF SWING TRAINING DEVICE

(71) Applicants: Cedric J. McCants, Atlanta, GA (US); Khalid A. Robinson, Los Angeles, CA (US)

(72) Inventors: Cedric J. McCants, Atlanta, GA (US); Khalid A. Robinson, Los Angeles, CA (US)

( * ) Notice: Subject to any disclaimer, the term of this patent is extended or adjusted under 35 U.S.C. 154(b) by 0 days.

(21) Appl. No.: 18/487,260

(22) Filed: Oct. 16, 2023

(65) Prior Publication Data

US 2024/0123290 A1    Apr. 18, 2024

Related U.S. Application Data

(60) Provisional application No. 63/416,260, filed on Oct. 14, 2022.

(51) Int. Cl.
| | |
|---|---|
| *A63B 5/00* | (2006.01) |
| *A63B 24/00* | (2006.01) |
| *A63B 71/06* | (2006.01) |
| *A63B 102/32* | (2015.01) |

(52) U.S. Cl.
CPC ...... *A63B 24/0075* (2013.01); *A63B 71/0622* (2013.01); *A63B 2024/0012* (2013.01); *A63B 2071/0625* (2013.01); *A63B 2102/32* (2015.10); *A63B 2220/05* (2013.01)

(58) Field of Classification Search
CPC .................. A63B 24/0075; A63B 71/0622
See application file for complete search history.

(56) References Cited

U.S. PATENT DOCUMENTS

| | | | | |
|---|---|---|---|---|
| 2009/0066641 A1* | 3/2009 | Mahajan | .............. | G06F 3/017 345/156 |
| 2010/0267462 A1* | 10/2010 | Mooney | ................ | A63B 69/36 473/409 |
| 2021/0220718 A1* | 7/2021 | Tuxen | ............... | A63B 24/0021 |

* cited by examiner

*Primary Examiner* — Kesha Frisby
(74) *Attorney, Agent, or Firm* — Armstrong Teasdale LLP

(57) ABSTRACT

A golf swing instructional training system is provided. The system includes a display, at least one image capturing device, a neural network, and a biomechanics assessment server. The image capturing device transmits data for use in analyzing motion of a user using the system. The neural network receives data transmitted from the image capturing device. The display is coupled to neural network and displays data received from the user and generated from the neural network. The biomechanics assessment server analyzes data transmitted from the capturing device and any input by the user. The assessment server includes at least a biomechanics rules library for use in analyzing the motion of the user based on body landmarks of the user identified by the neural network. The biomechanics rules library includes at least a golf club database, and a swing database. The neural network provides feedback to the user to facilitate improving at least one of the user's golf stance when addressing a ball, and the user's golf swing.

18 Claims, 6 Drawing Sheets

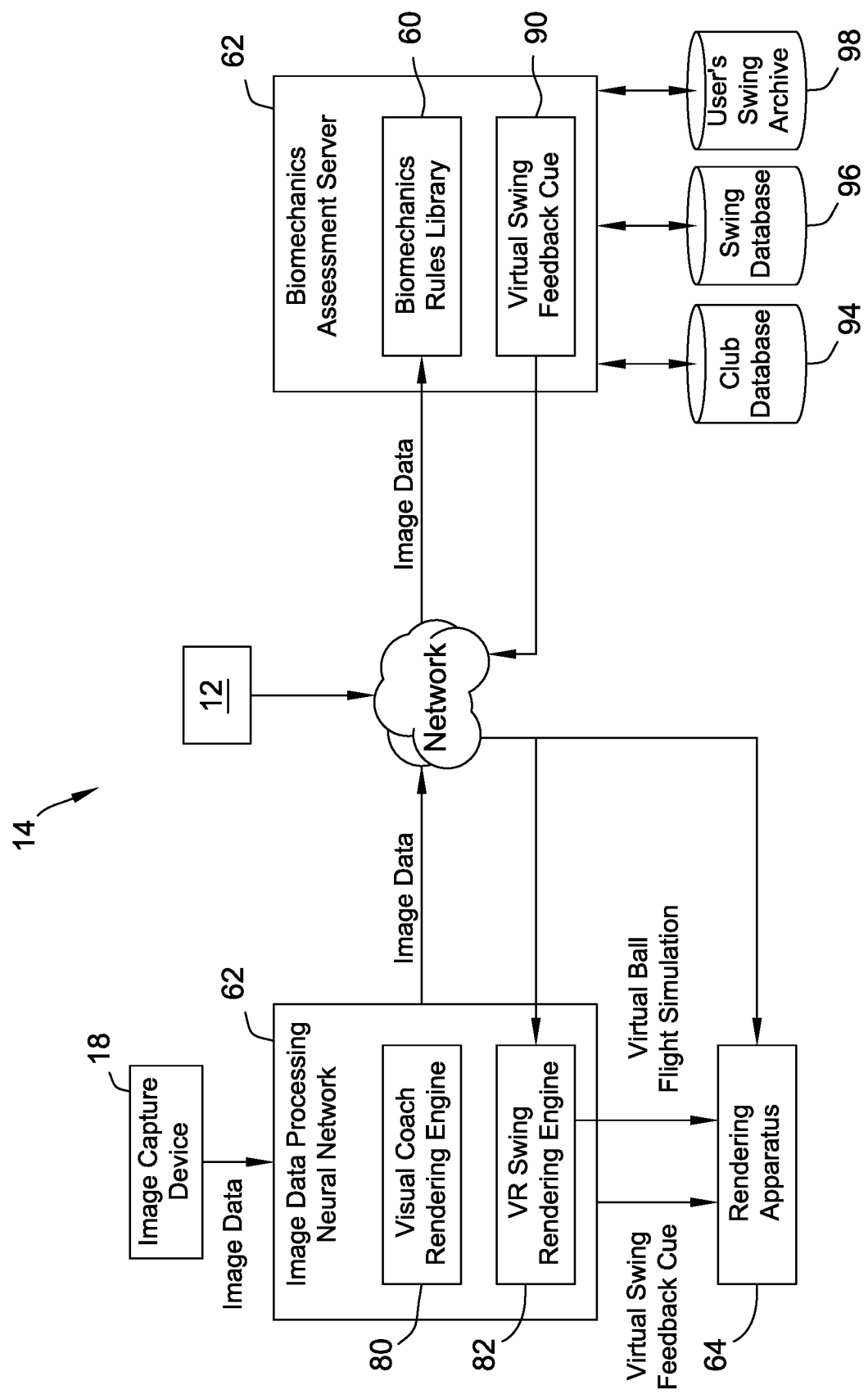

GOLF SWING TRAINING DEVICE

BACKGROUND

The field of the disclosure relates generally to a golf training device that helps a golfer develop proper form and coordination and, more particularly, to a computing system that in response to an interactive biomechanical visualization system, provides feedback in real-time to the user.

As the popularity of golf has grown world-wide, the need for proper instruction and training has grown exponentially. During a round of golf, a participant is challenged to consistently execute a proper golf swing. Part of the difficulty in golf for golfers is being able to consistently duplicate proper golf swings. One key to developing a proper golf swing is to ensure that fundamental basics, such as hand grip position, arm movement, shoulder movement, and head positioning are correct and are coordinated through the swinging motion. A second fundamental principle of developing a proper swing is developed through practicing to develop "muscle memory.

To assist golfers in developing muscle memory and a proper swing, golfers commonly work with golf instructors, and/or golf simulators. Although golf instructors are often viewed as the most important means of golf training, better instructors are often expensive, and because the training must typically be scheduled at a facility or course in advance with the instructor, the availability for instruction may be limited. In addition, because the golf swing involves so many different aspects, including the movement of the golfer's upper and lower body, movement of the golfer's arms and shoulders, movement of the golfer's hands, movement of the golfer's head, hands, and feet, movement of the golfer's upper and lower legs, movement of the golfer's knees, and the coordination of the entire golfer, even the best golf instructors can realistically only see a portion of a golfer's swing while instructing them. As a result, golfers often rely on mechanical training devices and golf simulators for practice in developing their swing. Although at least some of such devices often are capable of capturing much more data about a golfer's swing than a human instructor, such devices may not provide corrective feedback in real-time. Moreover, such devices capture additional data, including club head speed, an angle of the face of the club relative to the ball, and/or a height of the face of the club relative to the ball, such information may not easily identify any fundamental issues with the golfer's swing. Lastly, such training devices are generally expensive and are not cost-effective or convenient for a golfer to install at their house.

As such, it would be desirable to provide a golf instruction training system that is cost effective, reliable, and that provides real-time feedback to a user desiring to train at home.

BRIEF DESCRIPTION

In one aspect, a golf swing training system is provided. The system includes a display, at least one image capturing device configured to transmit data for use in analyzing motion of a user within a predefined distance from the display, a neural network, and a biomechanics assessment server. The neural network is configured to receive data transmitted from each image capturing device. The display is coupled to the neural network and is configured to display data received from the user and from the neural network. The biomechanics assessment server configured to analyze data transmitted from said at least one capturing device, said assessment server containing at least a biomechanics rules library for use in analyzing the motion of the user based on body landmarks identified by the neural network of the user, said biomechanics rules library including at least a golf club database, and a swing database, said neural network configured to provide feedback to the user to facilitate improving at least one of the user's golf stance when addressing a ball, and the user's golf swing.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein:

FIG. 4 is an enlarged schematic view of a portion of the network shown in FIG. 3.

Figure 1:
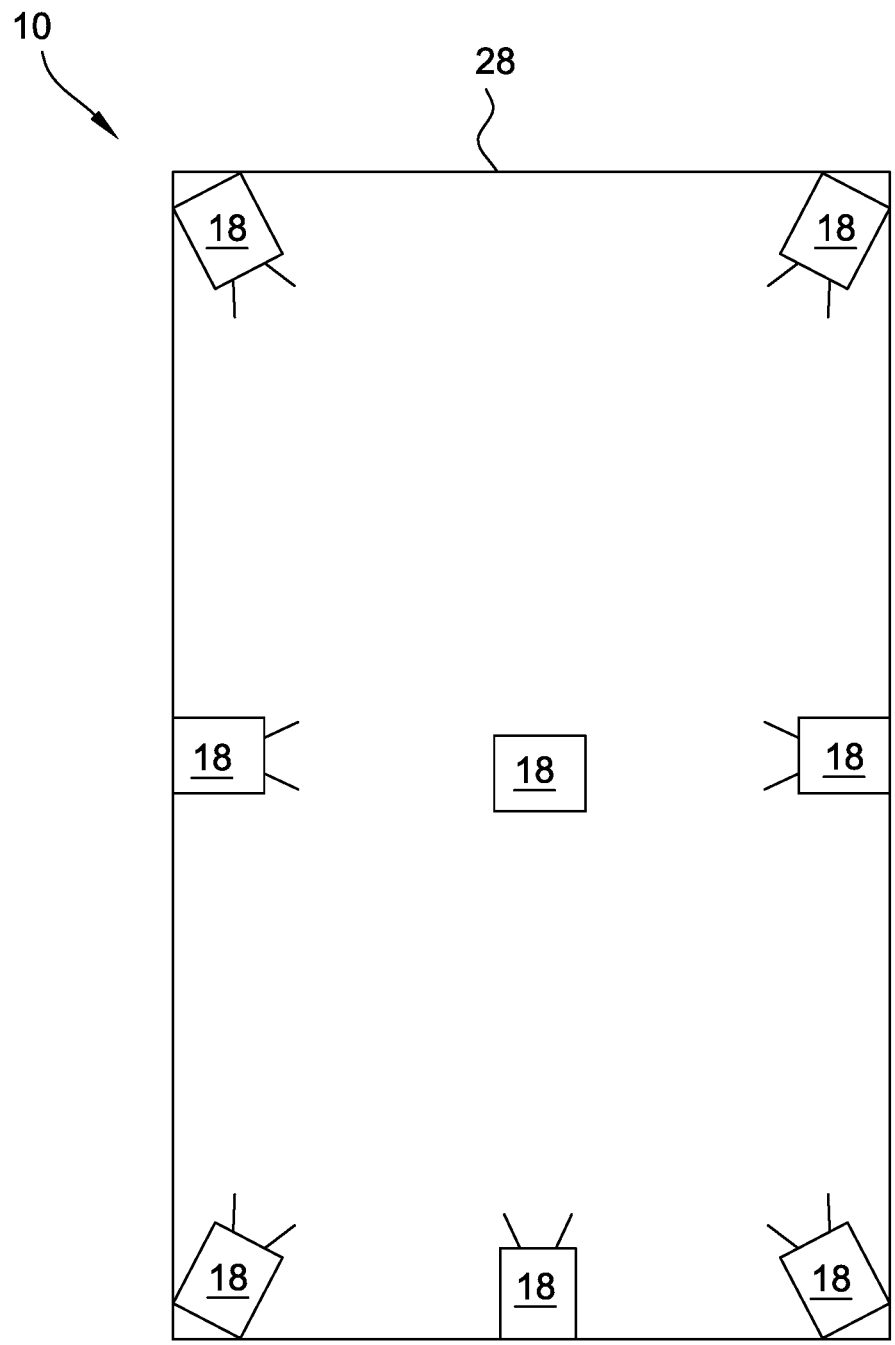
FIG. 1 is a schematic of an exemplary golf swing instructional training system.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings. In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

The singular forms "a", "an", and "the" include plural references unless the context clearly dictates otherwise. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, a programmable logic controller (PLC), and application specific integrated circuit, and other programmable circuits, and these terms are used interchangeably herein. In the embodiments described herein, memory may include, but is not limited to only including, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the example embodiment, additional output channels may include, but are not limited to only including, an operator interface monitor.

Further, as used herein, the terms "software" and "firmware" are interchangeable and include any computer program stored in memory for execution by a processor, including RAM memory, ROM memory, EPROM memory, EEPROM memory, and non-volatile RAM (NVRAM) memory. The above memory types are example only and are thus not limiting as to the types of memory usable for storage of a computer program.

As used herein, the term "non-transitory computer-readable media" is intended to be representative of any tangible computer-based device implemented in any method of technology for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including without limitation, volatile and non-volatile media, and removable and non-removable media such as firmware, physical and virtual storage, CD-ROMS, DVDs, and any other digital source such as a network or the Internet, as well as yet to be developed digital means, with the sole exception being transitory, propagating signal.

Generally, embodiments described herein relate to golf swing training devices that rely on biomechanical visualization systems. In one embodiment, an interactive visualization system includes multi-cameras that transmit images through a neural network, wherein the image data transmitted corresponds to biomechanical movements of a user performing a golf swing. The cameras are integrated with a display that provides a high-definition display. In some embodiments, the cameras integrate with facial recognition software that activates the golf swing training apparatus when a user walks in the field of the display. Moreover, in some embodiments, the system also recognizes whether the user in the field of the display includes a golf club in their hand, and if so, can subsequently identify which club is in their hand, i.e., whether it is an iron or a wood (fairway or driver), and which specific iron or wood it is.

After the system has recognized a user holding a club, in some embodiments, an "ideal" stance, based on pre-loaded and detected physical attributes and dimensions of the user, is displayed in a graphic form on the display and the user is prompted to assume the desired golf swing stance by essentially mirroring or replicating what is displayed to the user. Various aspects of the user's stance are compared to data pre-loaded in the system, i.e., a library of pre-stored positioning data, and the user's stance is modified based on the comparison using audio and visual prompting provided to the user.

After the user has either replicated the pose displayed in the display or has been moved to a desired position via prompting, the user is prompted to swing the golf club. The cameras record and transmit the user's swing to the system which provides real-time audio feedback of the biomechanical movement of the user to the user. The display displays a replay of the swing and in some embodiments, the user may select to see a comparison of their swing to an ideal generated swing and/or to a previously stored swing of the user. In addition, the display may also display additional information based on the user's swing, including a ball trajectory and flight path based on their swing and projected onto any of selected several golf courses holes, and/or ball speed, club face angle at the point of impact, club head speed, and ball loft, for example. Continuous improvement feedback is transmitted and/or displayed to the user with coaching tips and/or exercises and/or swing drills and practice routines generated based on the user's swings to facilitate improving the user's swing. As a result, the interactive golf swing training apparatus described herein provides a training mechanism that a user may use at their house or home that facilitates improving their swing in a cost-effective and reliable manner.

Figure 2:
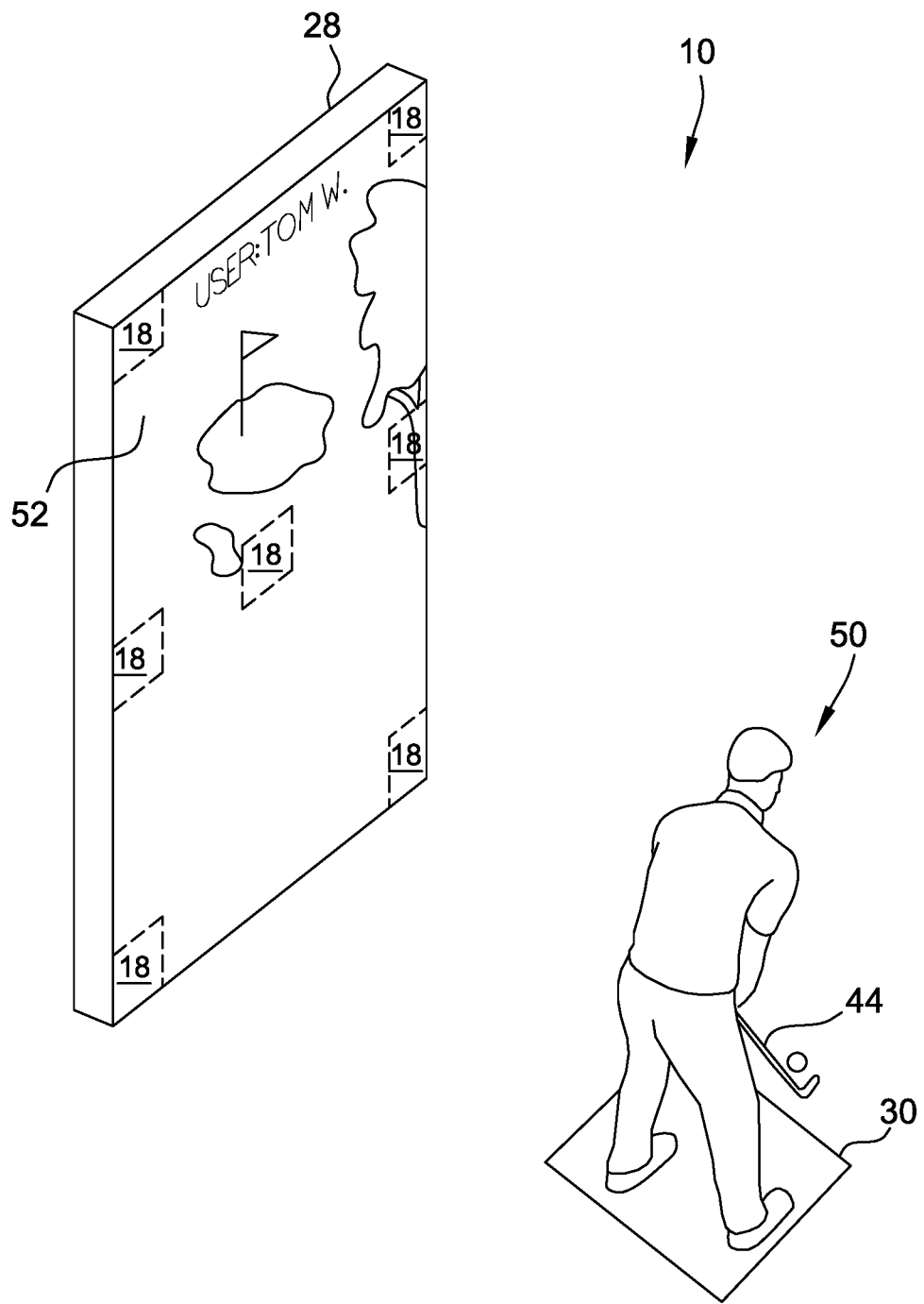
FIG. 2 is a perspective view of a portion of the golf swing instructional training system shown in FIG. 1 and including a user.
Figure 3:
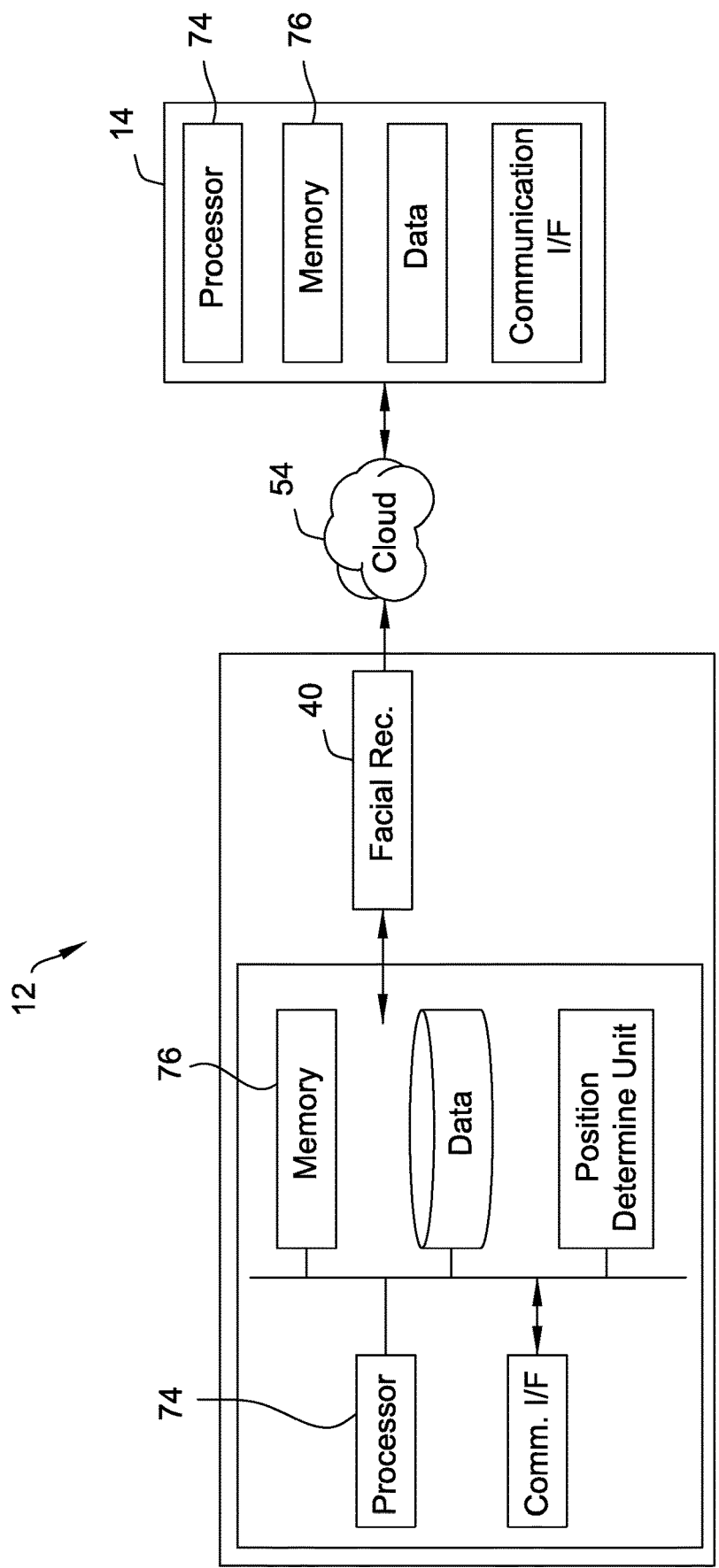
FIG. 3 is a schematic of a portion of a network that may be used with the golf swing instructional training system shown in FIGS. 1 and 2.
Figure 6:
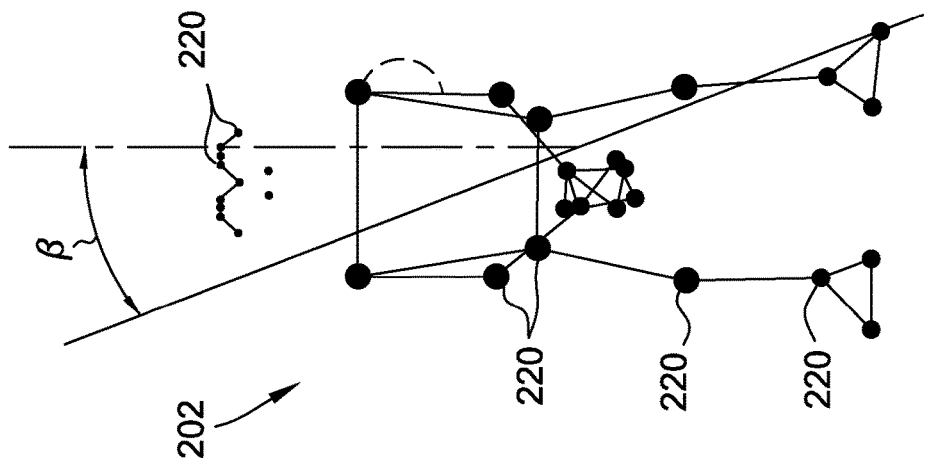
FIGS. 5-8 illustrate exemplary body landmarks that may be identified and analyzed by the network shown in FIGS. 3 and 4.
Figure 5:
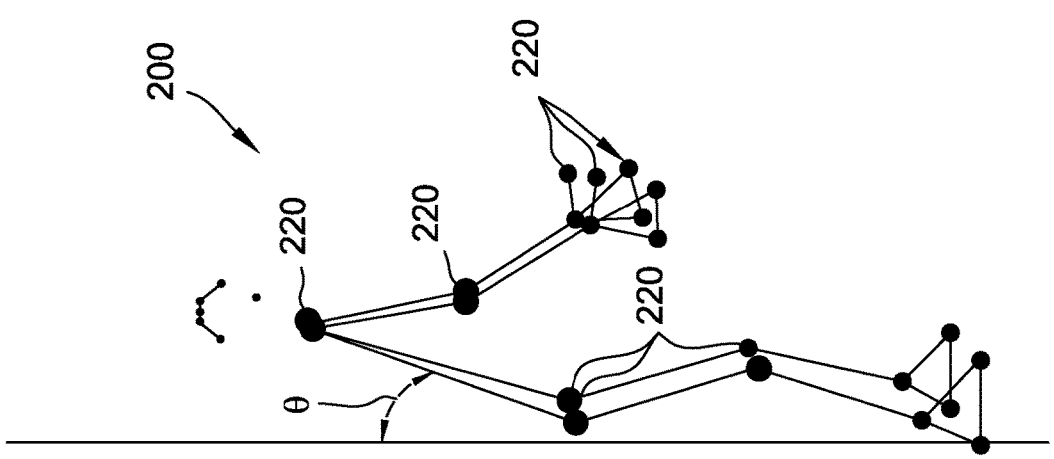
Figure 8:
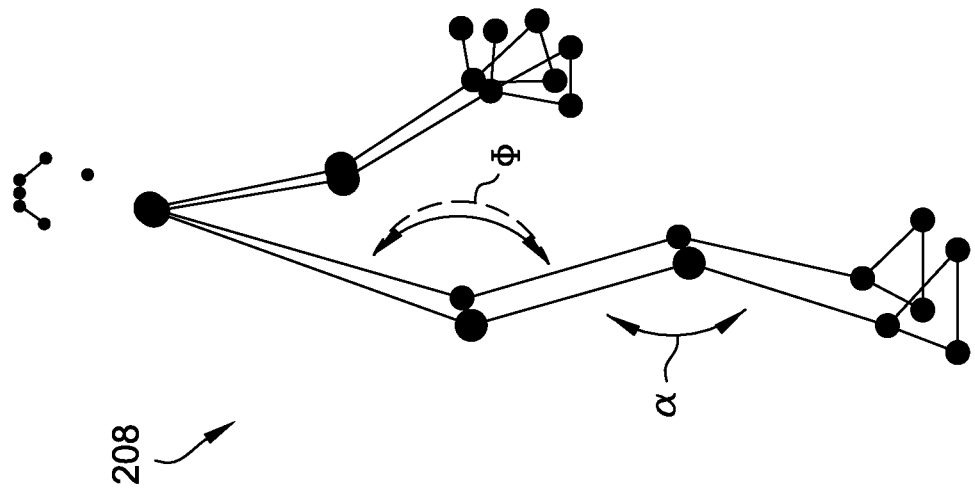
Figure 7:
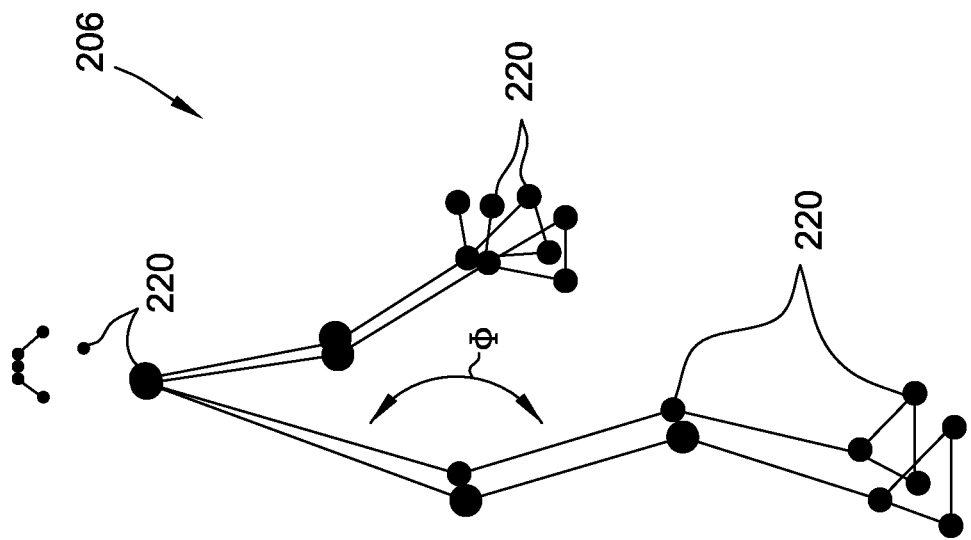

FIG. 1 illustrates a block diagram of an exemplary golf swing instructional training system 10. FIG. 2 is a perspective view of a portion of the golf swing instructional training system 10 and including a user. FIG. 3 illustrates an exemplary network 12 that may be used with training system 10. FIG. 4 is an enlarged schematic of an exemplary neural network 20 that may be used with the golf swing instructional training system 10. FIGS. 5-8 illustrate exemplary body landmarks 110 of a user in different stages of a golf swing that may be identified and analyzed by the system 10 and network 14.

In the exemplary embodiment, system 10 includes a plurality of cameras 18, and a display 28. Cameras 18, in the exemplary embodiment, are high definition/high resolution video cameras that provide digital images of a golfer using system 10. In other embodiments, any other image capture device may be used that enables the golf swing training system 10 to function as described herein. More specifically, the cameras 18 are oriented to detect data generated by a user training on a training platform or mat 30. Cameras 18 may be oriented in any orientation or location relative to display 28 and/or mat 30 that enables system 10 to function as described herein. In the exemplary embodiment, the training platform 30 is includes a simulated grass surface, such as a synthetic turf surface. The cameras 18 transmit images through the network 12 wherein the image data transmitted corresponds to one or more biomechanical movements of a user.

The cameras 18 cooperate with, and interact with, the display 28. In the exemplary embodiment, cameras 18 are integrated with display 28 and are spaced about an outer periphery of display 28. In another embodiment, additional cameras 18 may be spaced about mat 30 and/or may be coupled to arms that are selectably extendable from display 18. Moreover, through the network 12, the cameras provide image data to a facial recognition system 40 such that when a user walks in front of the display 28, the facial recognition system 40 causes the training system 10 to activate and subsequently provides the user with access to the training system 10. Through the data transmitted to the network 12 via cameras 18, the training system 10 also recognizes if the user has a golf club 44 in their hand. In some embodiments, the network 12 is programmed to identify which type of club the user is holding, i.e., a wood, including drivers and fairway woods, a hybrid club including rescue and utility clubs, an iron, and/or a wedge. In other embodiments, the user has the option to input the type of club they intend to use for training into network 12. In one embodiment, system 10 can identify not only the type of club, but can also identify additional details associated with the club, such as the club manufacturer, the type of shaft used on the golf club, and/or the type of grip used with the golf club, for example.

After the system 10 has recognized that the user is holding a golf club, 44 the user is prompted through audio and visual feedback on the display 28 to assume a desired golf swing stance 50. In one embodiment, the display 28 is a mirror or monitor that is integrated with an ultra-LED display 52. In alternative embodiments, other types of displays may be used. In the exemplary embodiment, an ideal or desired swing stance is displayed on the display 28 to enable a user to mimic what is displayed. The ideal swing stance that is displayed is based on a plurality of factors, including the physical dimensions of the user, for example. In one embodiment, the user is prompted to enter their dimensions, including for example, their height, and/or sleeve length. In another embodiment, the network is able to estimate the user's dimensions based on the image data received. In the exemplary embodiment, the ideal golf swing stance displayed on the display 28 is based on a comparison of the user's body measurements to a stored library of biomechanical swing data such that the image generated is dimensioned in a manner that substantially matches the custom dimensions of the user.

After the user replicates the ideal swing stance displayed, the user is visually and audially prompted to swing the golf club. As the user swings, the cameras 18 transmit images to the network 12. Each image received by the network 12 is processed through the neural network 14 such that real-time audio feedback of a comparison of the user's swing to the ideal swing generated is provided to the user. Because the feedback is processed through the neural network 14, the user receives both positive reinforcement of correct biomechanical movement and/or corrective feedback. In addition, in the exemplary embodiment, the network 12 then displays a replay on the display 28 of the user's swing, side-by-side with the generated ideal swing.

The data points and images are also uploaded to the cloud server 54 wherein the network processes the data to provide even more accurate swing assessment utilizing machine learning, a comparison to a biomechanical rules library 60, a virtual sports feedback library, and historical data gathered from the user's swings over time. Golf club swing data is returned to the user's display 28 wherein a simulation of the ball's performance in a virtual reality environment is displayed to the user to assist in visualizing the result of their swing. In some embodiments, the user has the option to have their swing data saved to their device, such as a phone or tablet. In addition, in the exemplary embodiment, the golf swing data is also processed to enable golf club head tracking such that additional information, including information relevant to the user's posture, an angle of the golf club face at the point of impact, golf ball trajectory, and/or golf ball flight path information may be displayed based on the current swing of the user. In one embodiment, the user hits a foam golf ball from the training platform 30. In other embodiments, other types of balls, such as plastic or weighted balls, may be hit. Form improvement feedback is provided to the user, including proper coaching tips and/or exercises designed to facilitate improving the user's swing, and to enable the user to develop muscle memory.

In the exemplary embodiment, in addition to the cameras 18, the network 12 is coupled to the image data processing neural network 62, a rendering module 64, and a biomechanics assessment server 68, each of which is communicatively coupled to a processor 74. Initially, when an image is detected, the cameras transmit the image data to the image data processing neural network. The neural network is coupled to a memory 76 and includes several data bases that are pre-programmed with instructions. For example, in the exemplary embodiment, the neural network includes a visual coach rendering engine 80, and a virtual reality rendering engine 82. The visual coach rendering engine 80 generates, to the user, a rendering of an ideal golf stance for the user to address the golf ball.

The ideal golf stance is generated based on a combination of the user's body measurements either input by the golfer or detected from image data transmitted by the cameras 18. The ideal golf stance is also generated using information retrieved from a library of golf data pre-stored in the memory 76. For example, the library may contain amongst other data, pre-stored images or data acquired from professional golfers, instructors, collegiate players, or other players that are approximately the same build and/or that have approximately the same body measurements as the user using the system. In addition, the ideal golf stance is also generated based at least partially on any historical data saved that is associated with the user or golfer using the training system 10. The virtual reality engine 82 generates an ideal golf swing to display to the user in a side-to-side display that enables the user to mimic while receiving training.

The virtual reality engine 82 is coupled to a rendering apparatus 64 that generates virtual swing feedback and that in cooperation with the virtual reality swing rendering engine 82, generates a virtual ball flight simulation. As such, as the user is using the system and completes a swing, the golfer receives audio and visual feedback about their swing in near real-time. Moreover, as soon as the user completes a swing, the flight of the ball is displayed on the mirror 28 as a projected ball tracking path displayed over a selected golf course hole. In addition, the user can see a replay of their swing. In some embodiments, to better see deviations in the current swing, the user has the option to see a replay of their swing in a side-by-side format displayed with either the rendering of the ideal golf swing and/or with a past swing, of the user's saved in the system 10, i.e., based on historical data associated with the user.

The biomechanics assessment server 66 includes a pre-loaded biomechanics rules library 60 and a virtual swing feedback module 90. The biomechanics rules library 60 receives image data transmitted from the cameras 18 and based on that data, executes a feedback algorithm in cooperation with the virtual swing feedback module 90. The biomechanics assessment server 66 also includes a club database 94, a swing database 96, and an archive 98 of the user's swings. The club database 94 enables the system 10 to identify which club 44 the user is training with. In addition, based on the club 44 identified by the network 12, the biomechanics assessment server 66 can access pre-stored data from the swing database that is relevant to the club 44 selected by the user. As a result, the generated ideal golf stance and ideal golf swing are associated with the club 44 selected.

The biomechanics assessment server 66 is preloaded with an algorithm that enables the network 12 to initially detect the presence of a user through face recognition 40 and through motion detection, and if the user is detected as holding a club 44, the network 12 identifies which club 44 the user is holding. In an alternative embodiment, the training system 10 may be preprogrammed to identify that a user has addressed the golf ball and is about to initiate a golf swing in response to the user's movements, in response to the user verbally imputing a desire to initiate swing training, and/or in response to the system 10 receiving a manual input from a user, such as for example, the user flipping a switch. In another example, the training system 10 identifies that a user is about to initiate a swing after the user taps their foot or golf club 44 a pre-determined number of times, such as three times, on the training mat 30. The algorithm then, based on data transmitted from the cameras 18, detects the stance of the user and provides audio and visual feedback to assist the user in replicating a proper golf stance for the club 44 selected. Moreover, the algorithm uses data transmitted during the user's swings to track the accuracy and correctness of their swing.

In the exemplary embodiment, the biomechanics assessment server 66 may prompt the user to modify their stance based on the club 44 selected and based on the golf hole presented to the user—i.e, the hole being virtually played by the user. For example, the assessment server 66 may prompt the user to position their body such that their feet are aligned with a line parallel to the target line of an ideal golf path. In such a stance, the user is positioned through feedback from the network 12 to be at the proper distance and orientation relative to the golf ball in preparation for the swing.

In the exemplary embodiment, as the user swings a club, the algorithm is initially directed to ensuring fundamental body mechanics are correct. More specifically, in the exemplary embodiment, the user's swing is analyzed to ensure that the user is in the correct body position before and during their swing. For example, in the exemplary embodiment, the biomechanics assessment server 66 compares the user's body mechanics against pre-loaded critical body mechanic evaluations, including an evaluation 200 of the user's spine bend $\theta$, an evaluation 204 of the user's spine tilt $\beta$, an evaluation 206 of the user's hip bend $\phi$, and/or an evaluation of the user's knee flex $\alpha$. In other embodiments, additional or less body evaluations may be analyzed by server 66.

As best seen in the Figures, based on the data received from the cameras, the network evaluates 200 the user's spine bend $\theta$ as compared to that of a golfer performing an ideal swing. The actual spine bend $\theta$ is measured from vertical and ideally should be in a range of about 20° to about 30° from vertical to facilitate the user's shoulders, knees, and feet being "stacked" vertically during their golf stance as and swing. To identify the spine bend $\theta$, the server 66 analyzes the data received from the cameras 18 to identify specific body landmarks 220, including but not limited to, the relative position of the user's left ear, left hip, and left heel, as well as the relative position of the user's right ear, right hip, and right heel.

The network 12 uses some of the same body landmarks 220 to evaluate 206 the user's spine tilt $\phi$. More specifically, when evaluating 206 the spine tilt $\phi$, after the user has assumed their golf stance, the biometrics assessment server 66 evaluates 206 the relative position of the user's nose, hip, and knee to determine the user's spine tilt $\phi$. Ideally, the user's body or spine tilt should be between 0° and an optimal prestored angle based on the height and the relative position of the user's front leg and knee. In some embodiments, the body tilt $\phi$ should be between_____° and _____°. In addition, in the exemplary embodiment, the biometrics assessment 66 uses many of the same body landmarks 220 to evaluate the hip bend $\alpha$ of the user. Specifically, the algorithm uses the relative position of the user's left shoulder, left hip, and left knee, as compared to the relative position of the user's right shoulder, right hip, and right knee. Moreover, in the exemplary embodiment, the biometrics assessment server 66 also evaluates 208 the knee flex $\alpha$ of the user both in their stance and during their swing, to ensure that the user's knee flex $\alpha$ stays substantially consistent through their swing. Specifically, to evaluate the knee flex $\alpha$ of the user the assessment server 66 analyzes the relative position of the user's right hip, right knee, and right ankle, as well as the relative position of the user's left hip, left knee, and left ankle.

The biometrics assessment server 66 also analyzes the body landmarks 220 of the user to facilitate improving the entire coordination of the user through the golf swing. For example, in some embodiments, the network analyzes the movement of the user's heel on their lead leg and the user's knee on their trailing leg to encourage the proper transfer of the user's weight during their golf swing. In such an embodiment, the user's landmarks 220 are analyzed to identify a transfer of weight by the user to their trailing leg and trailing hip during their backswing, whether the weight is being maintained on their trailing leg and trailing hip during the backswing, and whether their body weight is transferred forward led by their leading heel, leading leg, and leading hip during a transition into their downswing. Particularly, in one example, a proper sequence of golf swing movement may include initially detecting a raised heel of the leading leg foot, detecting whether the user's trailing leg is bent at their knee while the heel of the leading foot is still elevated, and then whether the leading foot is lowered while the trailing leg is still bent during their downswing. In one embodiment, the training platform or mat 30 may include sensors that provide data to the biometrics assessment server 66 to enable an enhanced analysis of the weight transfer of the user during their golf swing. The network provides feedback indications for these sequence of movements during the golf swing.

In some embodiments, a degree of the user's knee bend $\alpha$ or a magnitude of flexion of the knee can be used to further improve the user's golf swing. For example, the degree of the user's knee bend $\alpha$ or the magnitude of flexion at the knee can be used to analyze the completion of the user's golf swing. In such an embodiment, the biometrics assessment server 66 may initially detect the user's initial bend $\alpha$ of their knees before the user executes their swing. In some embodiments, the initial degree a of bend or magnitude of flexion is determined from data provided by the cameras 18 as the user settles into their initial golf stance. In some embodiments, the user may have to hold or maintain their initial golf stance for a short period of time to enable the biometrics assessment server 66 to detect the initial degree of bend α. For example, before initiating their golf swing, the network 12 may prompt the user to hold their initial golf stance for three seconds after receiving a visual or audible signal. The three seconds hold enables the network 12 to assess and analyze the initial degree of bend α before the user initiates their golf swing.

In each embodiment, the biometrics assessment server can be pre-programmed with a range of degrees for each measured user biometric. For example, in some embodiments, the network may prompt the user to enter their age or weight, and/or an assessment of their golf skill, such as beginner, novice, slightly skilled, skilled, collegiate player, and/or senior player. Based on the user's inputs as well as data received from the camera, a range of bend at the knee can be adjusted based on the data associated with the user. The network may be preprogrammed with a range of bend α at the user's knee can be represented as a degree of bend threshold. The range of bend α can represent an amount of bend that needs to occur from the initial degree of knee bend α to ensure that the trailing leg is sufficiently bent during the user's golf swing. The initial degree of bend α and the range of bend α can vary from user to user, and in the case of a single golfer, and can vary with the progression of the user's level of skill as they complete additional training sessions. As a result, in the exemplary embodiment, the network is programmed to accommodate different physical attributes and swing preferences of different users.

In the exemplary embodiment, after the display 28 is energized, the user may create an account to enable the network 12 to store data associated with that specific user as well as to enable facial recognition of the user. The system 10 is substantially murphy-proofed and includes a pre-loaded demonstration tutorial that may be initiated for first-time users. After the user is "recognized by the network 12, and is thus "enrolled" with the system 10, the user may connect and synch with on-line data provided within the system 10.

Initially, the user enters the "coach mode" of the algorithm wherein the biomechanics assessment server 66 either recognizes the golf club 44 being held by the user, or requests input from the user regarding the golf club 44 being used. At this point, the artificial intelligence of the network 12 has the information and data that is needed to initiate the "training mode" of the algorithm. In one embodiment, an ideal swing associated with an image having approximately the same physical make-up of the user is generated using the same club 44 selected by the user. The ideal swing is displayed in the display 28 after the user steps into the training platform 30. If this is the user's first sign-in into the network 12, the user may be prompted to input additional information to enable a baseline ideal swing to be generated. If this is not the user's first sign-in to the system 10, after the golf club 44 is recognized by the network 12, an ideal swing will be displayed in a manner that highlights key angle movements to the user.

The user then assumes a swing stance and is provided audio and/or visual feedback to prompt the user as necessary to correct aspects of their stance. In some embodiments, the user may wear augmented-reality (AR) glasses to further enhance their training experience. The user will attempt to substantially match the swing stance posture and body angle and when notified that their stance is within an acceptable range, will receive feedback from either the AR glasses or through the display to initiate a golf swing. In some embodiments, the user may be prompted to hold their stance for a predetermined amount of time, such as for three seconds, to enable the cameras 18 and lighting projected from the display to be calibrated to ensure that the lighting is optimal for the cameras 18.

When the user is prompted to swing, the artificial intelligence within the neural network 12 analyzes each frame transmitted from each camera 18, and plots all of the user's key body points 220. As each frame is recorded, the network 12 compares the user's swing to the desired/ideal swing angles. If the user's body angles and key measurements 220 are not within pre-defined acceptable ranges of the ideal swing, the user will receive near real-time feedback identifying the discrepancies. In contrast if the user's body angles and key measurements 220 are within pre-defined acceptable location ranges, the feedback from the network 12 may provide positive affirmation of the successful swing. In each case, following a swing, a user has the option to see a visualization of the ball travel and to check the data associated with each swing, including the club face angle of impact, the club head speed, the ball launch angle, and/or the ball exit velocity, for example. Moreover, following a series of stored swings, the network 12 will provide coaching tips, drills, and/or strategies to facilitate user improvement.

Embodiments described herein relate to golf swing training systems that rely on biomechanical visualization systems. The system described herein uses an interactive visualization system that includes multiple cameras that transmit images through a neural network that is integrated with artificial intelligence. The image data transmitted corresponds to biomechanical movements of a user performing a golf swing. The cameras are integrated with a display that provides a high-definition display that enables near real-time feedback to be provided to the user during training. The system described herein is affordable and provides users the ability to train anytime at their own home. In addition, as the user improves, the neural network of the system is modified to enable the user to continue to improve.

Through continued use of the golf swing training system described herein, a user can develop a proper sequence and coordination of their body positions and movements by way of a series of progressive feedback signals that are provided by the neural network in real-time or in substantially near real-time.

Exemplary embodiments of golf swing trainers and methods for training to improve a golf swing, are described above in detail. The methods and systems are not limited to the specific embodiments described herein, but rather, components of systems and/or steps of the methods may be utilized independently and separately from other components and/or steps described herein. For example, the method may also be used in combination with other training systems, including baseball swing training, softball swing straining, and/or tennis swing training, and are not limited to practice only with the golf swing training systems described herein. Rather, the exemplary embodiment can be implemented and utilized in connection with many other swing training systems.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A golf swing training system, said system comprising:
a display;
at least one image capturing device configured to transmit captured data for use in analyzing motion of a user within a predefined distance from said display, said at least one image capturing device integrated with said display;
a neural network configured to receive data transmitted from said at least one image capturing device, said display coupled to said neural network and configured to display data received from the user and from said neural network; and
a biomechanics assessment server configured to analyze data transmitted from said at least one image capturing device, said biomechanics assessment server containing at least a biomechanics rules library for use in analyzing the motion of the user based on body landmarks of the user identified by the neural network, wherein the body landmarks are spaced across the user's body, said biomechanics rules library including at least a golf club database and a swing database, said neural network configured to provide feedback to the user to facilitate improving at least one of the user's golf stance when addressing a ball, and the user's golf swing, said biometrics assessment server configured to provide audio and visual feedback to the user in real-time.

2. The golf swing training system in accordance with claim 1 wherein said biomechanics assessment server is configured to provide at least one of coaching tips, exercises, and practice routines to the user based on data gathered from said at least one capturing device.

3. The golf swing training system in accordance with claim 1 wherein said biomechanics assessment server is configured to provide a comparison of a user's golf swing received from the at least one image capturing device to a pre-stored ideal golf swing.

4. The golf swing training system in accordance with claim 3 wherein said biomechanics assessment server is configured to select the pre-stored ideal golf swing based on at least one of physical characteristics of the user, and a golf club selected for use by the user with the golf swing training system.

5. The golf swing training system in accordance with claim 1 wherein said biomechanics assessment server is configured to provide a comparison of a user's golf swing received from the at least one image capturing device to historical data associated with the user.

6. The golf swing training system in accordance with claim 1 wherein said display is configured to display at least one of a ball trajectory, a ball launch speed, a swing speed, a club head speed, and a ball loft to the user based on the user's swing while using the golf swing training system.

7. The golf swing training system in accordance with claim 1 wherein at least one image capturing device is integrated with a facial recognition system configured to automatically activate the golf swing training system based on recognition of the user.

8. The golf swing training system in accordance with claim 1 wherein the training system, using data transmitted from the at least one image capturing device, is configured to identify at least one of which type of golf club the user is holding, a manufacturer of the golf club manufacturer, the type of shaft used on the golf club, and a type of grip used with the golf club.

9. A training system comprising:
at least one image capturing device for use in analyzing motion of a user training within a predefined distance from said display;
a neural network coupled to said at least one image capturing device for receiving captured data transmitted from said at least one image capturing device; and
a biomechanics assessment server coupled to said at least one capturing device for receiving biomechanical data from the user training within the training system, said biomechanics assessment server containing at least a biomechanics rules library for use in analyzing the motion of the user based on body landmarks of the user identified by the neural network, wherein the body landmarks are spaced across the user's body, at least one of said biomechanics assessment server and said neural network configured to provide at least one of audio feedback, audiovisual feedback, and visual feedback to the user in real-time to facilitate improving the coordinated performance of the user.

10. The training system in accordance with claim 9 wherein the biomechanics rules library includes data associated with at least one of a softball swing, a baseball swing, a tennis swing, and a golf swing.

11. The training system in accordance with claim 9 wherein the biomechanics rules library includes data associated with at least one of a softball swing, a baseball swing, a tennis swing, and a golf swing.

12. The training system in accordance with claim 9 wherein when a user is training within the training system, at least one of the neural network and the biomechanics assessment server identifies a relative position of at least one of a left ear of the user, a left hip of the user, and a left heel of the user, a right ear of the user, right hip of the user, and a right heel of the user.

13. The training system in accordance with claim 9 further comprising a visual coach rendering engine configured to generate an ideal swing for the user to mimic while training in the training system.

14. The training system in accordance with claim 9 wherein the training system is configured to generate an ideal swing for the user to mimic based on a comparison of body measurements associated with the user to a stored library of biomechanical swing data.

15. The training system in accordance with claim 14 wherein the training system is configured to display a replay of the user's swing side-by-side with the generated ideal swing.

16. A golf training system comprising:
a plurality of cameras for capturing motion of a user training within the training system;
a biomechanics assessment server coupled to said plurality of cameras for receiving biomechanical data from the user training within the training system, said biomechanics assessment server coupled to a neural network for sorting data transmitted from said plurality of cameras, said biomechanics assessment server cooperating with said neural network to identify body landmarks of the user and to provide feedback to the user before the user swings and after the user swings within the training system, wherein the training system is configured to provide audio and visual feedback to the user in real-time; and at least one display configured to display data to the user within the training system.

17. The golf training system in accordance with claim 16 wherein said training system is configured to provide at least one of coaching tips, exercises, and practice routines to the user based on data transmitted from said plurality of cameras.

18. The golf training system in accordance with claim 17 wherein said biomechanics assessment server is configured to:

generate an ideal golf swing based on biomechanical data associated with the user and based on which golf club the user is using to train; and display a comparison of the user's swing side-by-side to the generated ideal golf swing.

* * * * *